United States Patent
Lopez, Sr. et al.

(10) Patent No.: US 6,649,838 B1
(45) Date of Patent: Nov. 18, 2003

(54) SAFETY ELECTRICAL OUTLET

(76) Inventors: Rudy A. Lopez, Sr., P.O. Box 813, Sahuarita, AZ (US) 85629; Ezequiel R. Lopez, III, 3001 W. Idaho St., Tucson, AZ (US) 85746

( * ) Notice: Subject to any disclaimer, the term of this patent is extended or adjusted under 35 U.S.C. 154(b) by 0 days.

(21) Appl. No.: 09/358,273

(22) Filed: Jul. 21, 1999

Related U.S. Application Data

(60) Provisional application No. 60/093,538, filed on Jul. 21, 1998.

(51) Int. Cl.$^7$ ............................................. H02G 3/14
(52) U.S. Cl. ........................ 174/67; 174/66; 220/241; 220/242; 439/135
(58) Field of Search ...................... 174/66, 67; 220/241, 220/242, 38; 439/135, 136; D13/156, 177

(56) References Cited

U.S. PATENT DOCUMENTS

| | | | | |
|---|---|---|---|---|
| D261,135 S | * | 10/1981 | Horne | D13/30 |
| 4,616,285 A | * | 10/1986 | Sackett | 361/1 |
| 4,740,655 A | | 4/1988 | Ford | 174/67 |
| 4,851,612 A | | 7/1989 | Peckham | 174/67 |
| 4,915,638 A | | 4/1990 | Domian | 439/142 |
| 4,993,963 A | | 2/1991 | Pedigo | 439/142 |
| 5,045,640 A | | 9/1991 | Riceman | 174/67 |
| 5,195,901 A | | 3/1993 | Correnti | 439/147 |
| 5,218,169 A | | 6/1993 | Riceman | 174/67 |
| 5,243,135 A | * | 9/1993 | Shotey | 174/67 |
| 5,252,083 A | | 10/1993 | Correnti | 439/147 |
| 5,264,662 A | | 11/1993 | Kennedy | 174/67 |
| 5,342,995 A | * | 8/1994 | Comerci et al. | 174/67 |
| 5,362,924 A | | 11/1994 | Correnti | 174/67 |
| 5,382,755 A | | 1/1995 | Correnti | 174/67 |
| 5,389,740 A | | 2/1995 | Austin | 174/67 |
| 5,477,010 A | * | 12/1995 | Buckshaw et al. | 439/137 X |
| 5,527,993 A | | 6/1996 | Shotey et al. | 174/67 |
| 5,533,637 A | * | 7/1996 | Williams, Jr. | 220/3.8 |
| 5,556,289 A | | 9/1996 | Holbrook, Jr. | 439/135 |
| 5,571,023 A | * | 11/1996 | Anthony | 220/242 X |
| 5,727,958 A | * | 3/1998 | Chen | 174/67 X |
| 5,779,083 A | * | 7/1998 | Bordwell | 220/242 |
| 5,835,980 A | * | 11/1998 | Houssian | 174/67 |
| 5,912,432 A | * | 6/1999 | Thomas | 220/242 X |
| 5,932,845 A | * | 8/1999 | Lacy | 174/67 |
| 5,998,735 A | * | 12/1999 | Patterson, Jr. | 439/135 X |

* cited by examiner

Primary Examiner—Dhiru R Patel
(74) Attorney, Agent, or Firm—Durando Birdwell & Janke, PLC

(57) ABSTRACT

A new and improved safety outlet includes of a one-piece structure which is installed on a standard electrical receptacle in place of a standard receptacle cover. The electrical plugs installed in the outlets of the electrical receptacle are completely enclosed within the fire resistant and electrically insulating structure; baffles are incorporated into the rigid base to prevent an infant or young person from inserting a rigid object through the passages in the structure for electrical cords and thereby preventing contact with the electrical supply voltages; and three tabs spaced on three sides of the cover portion must be simultaneously pressed to allow the structure to be opened for access to the electrical plugs, thereby preventing access to the enclosed region and preventing contact with the electrical supply voltages.

3 Claims, 2 Drawing Sheets

SAFETY ELECTRICAL OUTLET

RELATED APPLICATIONS

This application relates to a Provisional Application No. 60/093,538, filed on Jul. 21, 1998, by the same inventors.

BACKGROUND OF THE INVENTION

1. Field of the Invention

The present invention relates generally to the field of electrical outlets and more particularly to devices which cover an outlet to prevent unintentional contact with the electrical supply voltage provided by the outlet and therefore prevent accidental electrocution.

2. Description of the Prior Art

The field of devices which cover an electrical receptacle to prevent accidental contact with the electrical supply voltage has been studied extensively and a variety of approaches have been developed. This field is important due to the fact that in most installations an electrical receptacle is located such that the young, infants and toddlers, can easily access the electrical voltage provided by the outlets of the receptacle. Even though the need to protect these persons from the threat of accidental electrocution is clearly defined, the approaches to the solution of the problem vary greatly.

One example is disclosed in U.S. Pat. No. 4,915,638 issued to Domian. This device consists of a hinged cover which in a closed position totally encloses the face of the electrical outlet. The cover is held in the closed position by a childproof lock. The lock is a single flexible tab which engages a slot in the mounting plate of the invention to lock the cover in a closed position. The cover has slots in the bottom edge of sufficient dimension to allow for the passage of electrical cords. Even when the cover is in a closed or locked position a metallic or other electrically conductive instrument could be passed through the cord slots in such a way as to make contact with the electrical supply voltage. This is especially true when a cord is not passing through one or more of the slots.

Another example similar in approach to the Domian Patent is disclosed in U.S. Pat. No. 4,740,655 issued to Ford. This device again consists of a hinged cover which totally encloses the face of the electrical outlet when the cover is in a closed position. Various hinge and childproof lock arrangements are disclosed which allow a person of sufficient knowledge and dexterity to unlock and open the cover which is hinged from one side. Openings in the cover allow for the passage of electrical cords. As in Domian, no provision is made for blocking access to the electrical supply voltage by objects inserted through the passages for the electrical cord or cords.

In a similar manner, U.S. Pat. No. 4,851,612 issued to Peckham; U.S. Pat. No. 5,045,640 issued to Riceman; U.S. Pat. No. 5,195,901 issued to Correnti; U.S. Pat. No. 5,218,169 issued to Riceman; U.S. Pat. No. 5,252,083 issued to Correnti; U.S. Pat. No. 5,264,662 issued to Kennedy, U.S. Pat. No. 5,362,924 issued to Correnti; U.S. Pat. No. 5,382,755 issued to Correnti; U.S. Pat. No. 5,389,740 issued to Austin; and U.S. Pat. No. 5,556,289 issued to Holbrook all disclose devices which include a baseplate which is attached to the electrical outlet and a separate hinged cover which completely encloses the electrical outlet when the cover is in a closed and locked position. In each of the above patents, provision is made for a childproof lock to prevent a person not having the requisite knowledge and manual dexterity from opening the cover. The patents listed above allow for passage of an electrical cord or cords through the cover but do not prevent an electrically conductive object inserted through the passage for the electrical cord from making contact with the electrical supply voltage. Therefore the possibility of accidental electrocution still exists even with the cover in a closed position.

U.S. Pat. No. 5,527,993 issued to Shotey, et al. discloses a device which includes a baseplate and separate hinged cover as in the above patents. The device also includes a rubber boot or rubber flaps on the inside of the cover to make the device weatherproof. The electrical safety aspects of this device or childproof latch are not claimed. It appears, however, that the protective boot or flaps would in addition to making the device weather proof also prevent an electrically conductive object from being inserted in such a way as to make contact with the electrical supply voltage. The device consists of multiple pieces and is of a complexity which would make it difficult to produce economically.

Finally, U.S. Pat. No. 4,993,963 issued to Pedigo discloses a hinged cover and baseplate joined as a single unit by a "living" hinge. The slot through the cover of the device for the passage of electrical cords is large and extends from the edge of one side of the cover portion to a point at the midpoint of the front of the cover. The arrangement of the large slot in the device provides an even greater opportunity for a young person to insert an electrically conductive object through the cover and into contact with the electrical supply voltage and therefore creates an even greater possibility of accidental electrocution.

Thus, a variety of safety devices for electrical receptacles are known. All of the referenced devices employ a removable or hinged cover to completely enclose the electrical cords and plugs which are connected to the outlets of the receptacle. However, none of the above-described references disclose a simple one-piece safety enclosure for installation on an electrical receptacle which completely protects a young person from accidental electrocution.

Accordingly, it would be desirable to develop an electrical safety outlet which completely protects a young person from accidental electrocution. At the same time the electrical safety outlet must be a simple, one-piece design for ease of manufacture.

SUMMARY OF THE INVENTION

In view of the foregoing disadvantages inherent in the known types of safety covers or enclosures for electrical receptacles, the present invention makes available complete protection from electrocution at an affordable price. As will be seen from the following description, it is the goal of the present invention to provide all of the protections afforded by the prior art with none of the disadvantages while at the same time reducing complexity.

To achieve this goal, the present invention comprises a one-piece structure molded or formed from a fire-retardant electrical insulation material and having a box-shaped cover joined at the top edge to a rigid base plate by a flexible hinge. The flexible hinge is formed by reducing the cross-section of the material in the region of the hinge. The flexible hinge allows the cover to rotate approximately 90° from a closed position wherein the cover engages the rigid base to an open position which allows electrical plugs to be inserted into the sockets of the electrical receptacle.

In use, the present invention is installed on an electrical receptacle by removing the standard cover and replacing it with the invention. The invention provides a mounting hole which is precisely aligned such that a standard mounting screw inserted through said mounting hole and tightened into the receptacle completes the installation. The cover of the invention is maintained in an open position during the installation process and for installation of plugs and power cords into the electrical outlets of the receptacle. Rectangular notches in the opposing side walls of the cover provide passageways for electrical cords when the cover is in a closed position. Once all plugs have been inserted into the outlets of the electrical receptacle the power cords attached to the plugs are routed through the notches in the cover and the cover is closed. Three stiff but flexible tabs formed as a part of the cover extend outward from the two opposing walls and the bottom wall of the cover and engage corresponding slots in the rigid base when the cover is closed. Baffles extending outwardly from and perpendicular to the plane of the rigid base allow for flexible electrical power cords to pass through the notches in the cover. Said baffles are located in such a manner that direct access by a rigid object to the interior region of the cover is prevented. The cover is maintained in a locked and closed position by small ridges formed on the tips of said tabs and extending outwardly away from the interior region of the cover and in a plane perpendicular to the plane of said tabs. When the cover is closed, the tabs pass through corresponding slots located in the rigid base and are forced inward toward the interior region of the cover as the said ridges at the tip of said tabs engage the wall of said slots. When the cover reaches the closed position the tabs snap outward away from the interior region of the cover as said ridges located at the tips of said tabs snap into recesses provided in the rigid base. To open the cover it is necessary to apply pressure inwardly toward the interior region of the cover on all three of said tabs simultaneously to allow said ridges to clear the walls of the slots in the rigid base. The size of the cover and the dexterity required to apply pressure to all three of the tabs simultaneously effectively prevents the cover from being opened by an infant or young child. Further, even if one or more of said tabs are not positioned properly for said ridges at the tips of said tabs to lock the cover in a closed position, the cover can only be opened by the proper application of force to the appropriate tabs to release the cover. In this way, a fail-safe feature is afforded by the present invention.

Said cover includes truncated trapezoidal protrusions aligned with the outlets of the electrical receptacle to provide clearance for the plugs and electrical cords. In this way the depth of the side walls of the cover is reduced for a better visual appearance and a reduction in the volume of material required to form the invention. For industrial and commercial applications, the protrusions and the depth of side walls can be increased to accommodate the larger plugs and electrical cords utilized in these applications.

In another embodiment of the present invention, a weather proof feature is provided by placing a gasket of a compressible and electrical insulator material between narrow plane surfaces formed in the corresponding mating edges of the cover and rigid base.

BEST MODES FOR CARRYING OUT THE INVENTION

Figure 1:
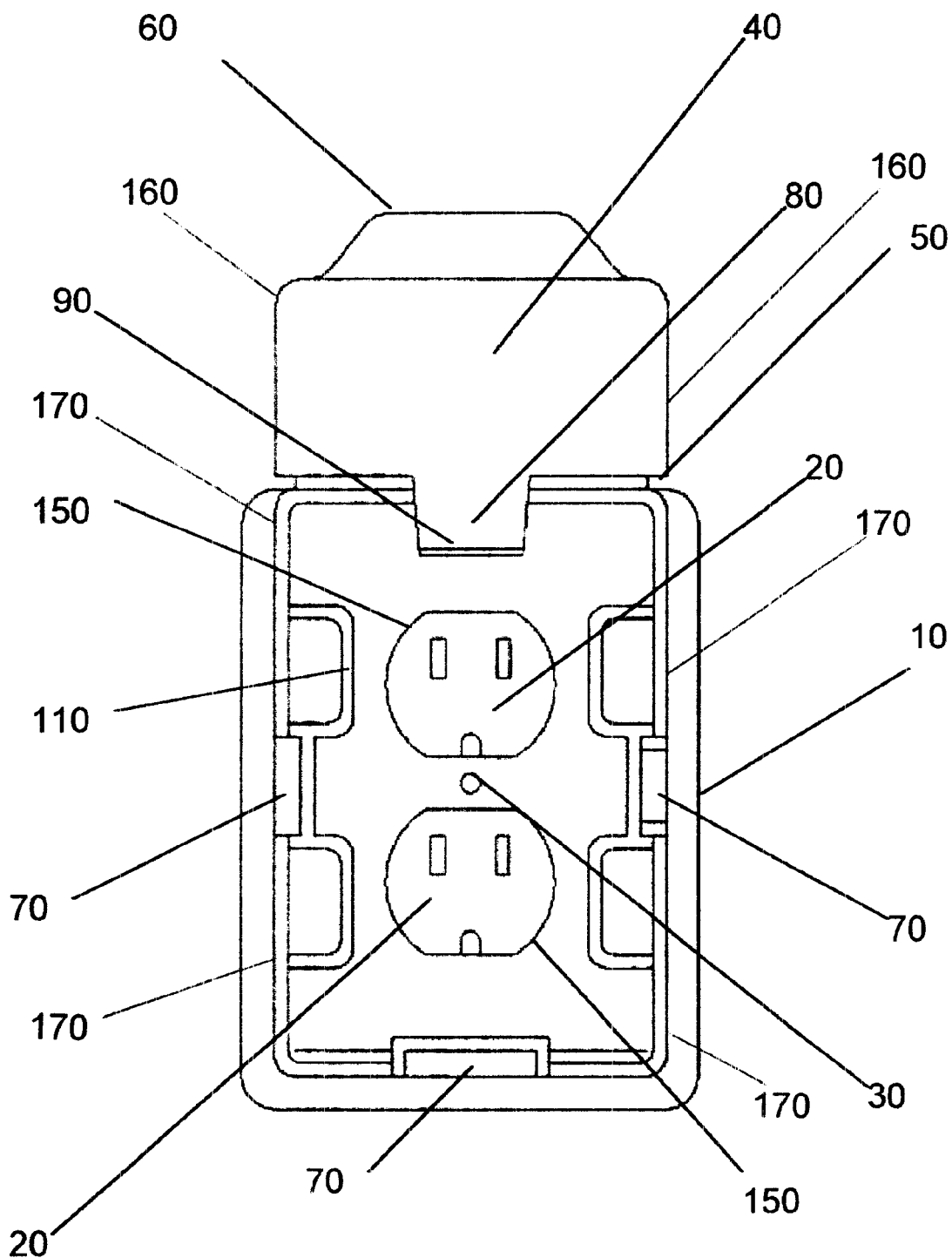
FIG. 1 is a front view of the invention showing the cover in an open position.
Figure 2:
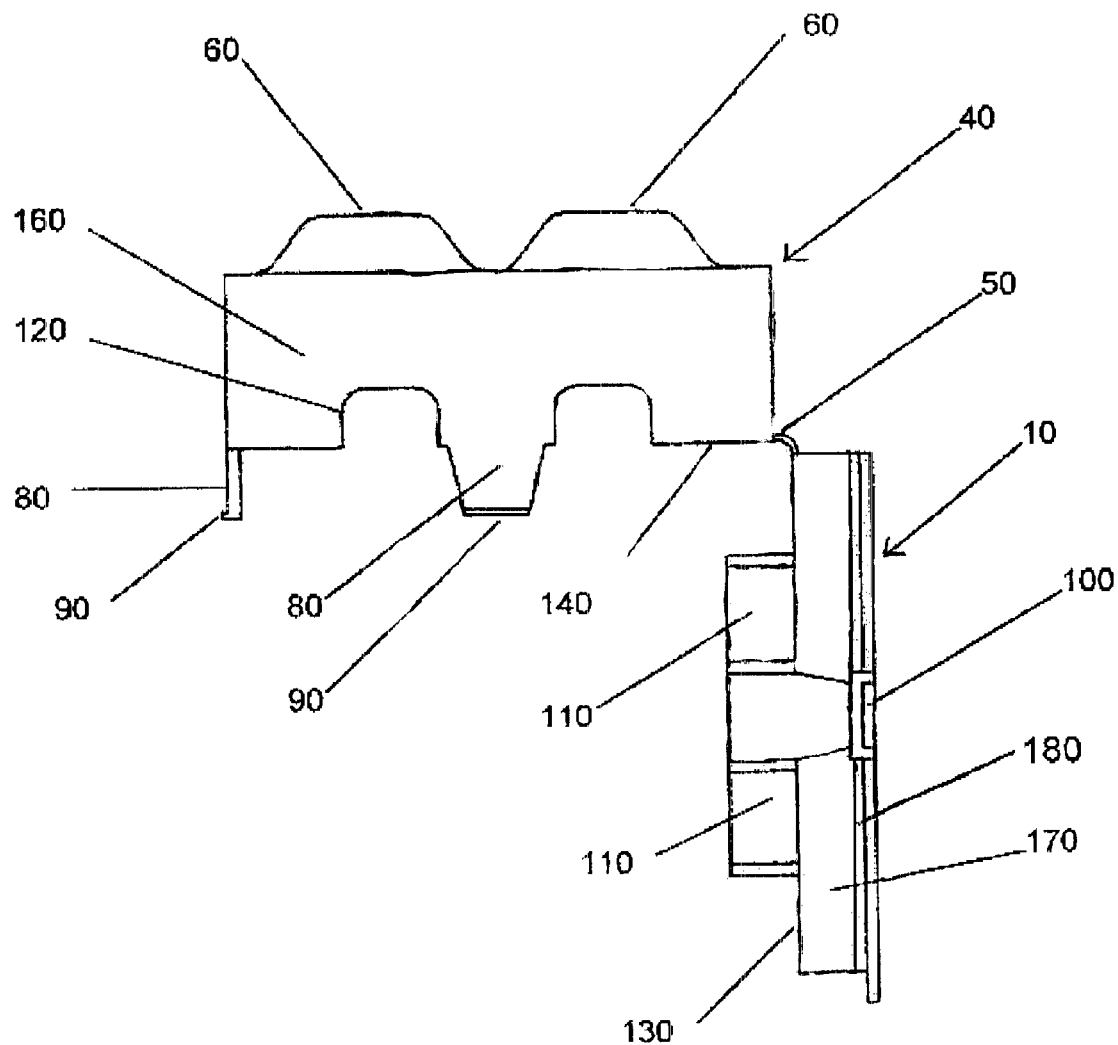
FIG. 2 is a side view of the invention showing the cover in an open position.

The preferred embodiment of the present invention can be best understood by reference to the drawings. FIG. 1 is a front view of the invention showing the cover in an open position. FIG. 2 is a side view of the invention showing the cover in an open position. Referring to FIG. 1, the preferred embodiment of the present invention is a one-piece structure molded or formed of a rigid fire-retardant and electrically insulating material. The invention consists of two major regions, a cover region 40 and a rigid base region 10 joined by a hinge region 50. The cover region 40 includes an open back wall 42, opposed side walls 160, and top and bottom walls 162 and 164, respectively. The hinge region 50 is created by reducing the cross-section of the material to create a flexible region in the material. The rigid base 10 is installed in place of a standard receptacle cover using a standard installation screw inserted in hole 30. The rigid base 10 provides for three notches 70 to receive the corresponding three tabs 80 of the cover 40 when the cover 40 is rotated 90° to a closed position. Four identical baffles 110 allow for the passage of flexible electrical cords into the interior of the cover 40 while at the same time blocking the passage of rigid objects. The rigid base 10 includes two holes 150 which match the outline of the outlets 20 of standard receptacles and allow rigid base 10 to be installed over said outlets 20. Referring to FIG. 2, the cover 40 includes two outward protrusions 60 of a truncated trapezoidal shape which provide clearance for electrical cords and plugs installed into outlets 20 (see FIG. 1). Four notches 120 are provided in the opposing side walls of said cover 40 to allow passage of electrical cords into the interior region of cover 40. Three notches 100 in the rigid base 10 allow ridges 90 located at the tips of the three tabs 80 to move in an outward direction and away from the interior region of the cover 40 when said cover 40 is in a locked position. The edge 140 of the opposed walls 160 of cover 40 and the edge 130 of the raised walls 170 of rigid base 10 are in physical contact when cover 40 is in a closed and locked position. In another embodiment of the invention, a gasket 180 of a compressible insulating material is placed between mating edges of the cover 40 and the rigid base 10, as shown in FIG. 2.

What is claimed is:

1. A one-piece structure molded or formed from a fire-retardant electrical insulation material and having a box-shaped cover being joined at a top edge to a rigid base plate by a flexible hinge for an electrical receptacle having at least two outlets for the insertion of electrical plugs, said one-piece structure comprising:

a cover having an open back wall, a front wall, top and bottom walls, opposed side walls, said side walls having at least two rectangular notches to allow for the passage of electrical cords, and said front wall having at least two protrusions in the form of truncated trapezoids extending outward and perpendicular to the plane of said front wall, said protrusions providing clearance for said electrical plugs and cords when the plugs are inserted into said outlets, and a rigid base having openings to match said outlets and at least one opening to match a mounting screw of said electrical receptacle, a raised wall completely encircling the perimeter of said rigid base extending outward from and perpendicular to the plane of said rigid base thereby creating walls which match the side walls of said cover, and a hinge connecting the top wall of said cover and a top wall of said rigid base and said hinge comprising a flexible region integral with said base and said cover accomplished by reducing the cross section of a material to create said flexible region in the material, said cover being openable by rotation about a centerline of said hinge from a closed position wherein the side walls of said cover are engaged with the raised wall of said rigid base to an open position in which the plane of the front wall of said cover is perpendicular to the plane of said rigid base to allow for the insertion of said electrical plugs into said sockets of the electrical receptacle, and locking means comprising three flexible tabs in the cover with raised engaging portions at respective tips thereof, said flexible tabs being extensions of the side and bottom walls of said cover and engaging corresponding slots in said rigid base to lock said cover in a closed position, said locking means being released only through inward pressure on all three of said flexible tabs simultaneously and thereby preventing access to the one-piece structure by a child, and a plurality of baffles extending outward and perpendicular to the plane of said rigid base and aligned with said notches in the side wall of said cover in such a manner as to allow the passage of the electrical cords and to block the entry of rigid objects through the notches in said cover.

2. The one-piece structure of claim 1, wherein the one-piece structure is weather proof, said weather proof structure comprising; a gasket of a compressible and electrical insulator material being inserted between narrow plane surfaces formed in the corresponding mating edges of the cover and rigid base in such a way as to completely seal the one piece-structure from moisture, dust or other foreign materials when said cover is in a closed and locked position.

3. The one-piece structure of claim 1, wherein the side walls of the cover and said protrusions in the cover extending outward from the plane of the front wall of said cover are increased for commercial and industrial applications to allow for the insertion of larger plugs and cords into the outlets of the electrical receptacle.

* * * * *